(12) United States Patent
Katerberg

(10) Patent No.: US 8,508,646 B2
(45) Date of Patent: Aug. 13, 2013

(54) CAMERA WITH INTERNAL POLARIZING FILTER

(75) Inventor: James A. Katerberg, Kettering, OH (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 12/609,316

(22) Filed: Oct. 30, 2009

(65) Prior Publication Data

US 2010/0157082 A1 Jun. 24, 2010

Related U.S. Application Data

(60) Provisional application No. 61/139,709, filed on Dec. 22, 2008.

(51) Int. Cl.
*G03B 11/00* (2006.01)
*G02B 5/30* (2006.01)

(52) U.S. Cl.
USPC ......... 348/335; 348/342; 348/222.1; 359/437

(58) Field of Classification Search
None
See application file for complete search history.

(56) References Cited

U.S. PATENT DOCUMENTS

| | | | |
|---|---|---|---|
| 3,978,497 A * | 8/1976 | Kondo | 396/241 |
| 6,028,303 A * | 2/2000 | Suzuki | 250/225 |
| 6,104,887 A * | 8/2000 | Hamasaki et al. | 396/534 |
| 6,137,958 A * | 10/2000 | Toyoda | 396/65 |
| 7,672,579 B2 | 3/2010 | Nomura | |
| 7,872,666 B2 | 1/2011 | Van Schaik et al. | |
| 8,059,275 B1 | 11/2011 | Pinhasov | |
| 2002/0006280 A1* | 1/2002 | Tanioka | 396/79 |
| 2002/0088927 A1* | 7/2002 | Simchoni | 250/225 |
| 2005/0140820 A1* | 6/2005 | Takeuchi et al. | 348/362 |
| 2006/0092313 A1* | 5/2006 | Kimura | 348/345 |
| 2006/0291073 A1* | 12/2006 | Nomura | 359/694 |
| 2007/0280669 A1* | 12/2007 | Karim | 396/155 |
| 2008/0186390 A1* | 8/2008 | Sato et al. | 348/222.1 |

FOREIGN PATENT DOCUMENTS

| | | |
|---|---|---|
| JP | 2002024818 | 1/2002 |
| JP | 2002259968 | 9/2002 |

OTHER PUBLICATIONS

Office Action and Search Report in corresponding CN Application No. 200980152181.7, dated Apr. 12, 2013.
EPO Examination Report in corresponding EP Application No. 09801320.4, dated Apr. 25, 2012.
PCT Search Report and Written Opinion in corresponding PCT Application No. PCT/US2009/006532, dated Mar. 24, 2010.

* cited by examiner

*Primary Examiner* — John Villecco
*Assistant Examiner* — Dwight C Tejano
(74) *Attorney, Agent, or Firm* — Wong, Cabello, Lutsch, Rutherford & Brucculeri LLP

(57) ABSTRACT

The present invention relates to cameras and other image capture devices. More particularly, the present invention relates to an image capture device having a polarizing filter that reduces reflected light during operation of the image capture device.

10 Claims, 8 Drawing Sheets

CAMERA WITH INTERNAL POLARIZING FILTER

CROSS-REFERENCE TO RELATED APPLICATION

This application claims the benefit of U.S. Provisional Application No. 61/139,709 filed on Dec. 22, 2008, which is incorporated herein by reference.

TECHNICAL FIELD

The present invention relates to cameras. More particularly, the present invention relates to a camera having a polarizing filter to reduce reflected light during operation of the camera.

BACKGROUND

The effects of reflected light have long been a common problem for professional and novice photographers alike. The light coming from the various objects in the scene to be photographed includes not only light having the color of the object but also light that may be reflected specularly from the object. While the specular reflection from an object, also called gloss or sheen, can add to the visual appeal of an object, for example the shiny finish of an automobile, the specular reflection of an object can also reduce the visual impact by reducing the apparent saturation, depth, or intensity of color of the object.

It is well known that light reflected specularly from the surface of an object can become at least partially polarized; that is the electric field vector of the reflected light tends to be oriented in particular direction. To the degree that the reflected light is polarized, it can be eliminated by placing a polarizing filter between the photographic media and the subject to be photographed. Polarizing filters are typically linear or circular.

When light is traveling in a particular direction, it has an electric field vector and a magnetic field vector. These field vectors are perpendicular to each other and to the direction of propagation. Light that is non-polarized has no preferred orientation for the electric field vector that is, its electric field vector, while perpendicular to the direction of propagation, can be at any azimuthal angle around the direction of propagation. When light has an electric field vector with a fixed orientation or azimuthal angle, the light is defined as being linearly polarized. Linear polarization commonly occurs in nature when light is reflected off of a flat surface. A linear polarizing filter allows only light having an electric field vector oriented a certain way, parallel to the polarization axis of the filter, to pass through. The amount of light incident on a polarizing filter that passes through the filter depends on the angle between the electric field vector of the light and the polarization axis of the polarization axis of the filter. For a polarizing filter to suppress the light polarized by a reflection off a surface, the polarizing filter must be oriented so that its polarization axis is perpendicular to the electric field vector of the reflected light. Thus, linear filters can block as much as 60% of the light from reaching the film.

The concept of circular polarization is similar to that to linear polarization. Circular polarization is a combination of two perpendicular linear waves that are 90 degrees out of phase with each other. Thus, a circular polarizing filter is nothing more than a linear polarizer, with the addition of a quarter-wave plate which converts the linear polarization of light passing through the polarizing filter to circular polarization. A circular polarizer is able to block all photons rotating in one direction while allowing those going in the other direction to pass.

It is well known that a polarizing filter is useful for reducing glare and by doing so producing more color contrast, but only if the polarizing filter has been rotated to the right orientation for the scene being photographed. For this reason, polarizing filters are screwed onto the front of the camera lens so that the photographer can rotate the filter to the desired angle. As the desired rotation angle of the filter can vary from scene to scene the photographer must observe the effect of the filter through the camera view finder while adjusting the filter rotation. While viewing a scene through the display or electronic viewfinder of a digital camera it can be hard to identify the preferred rotation of the filter as the image quality in the electronic display may not be sufficient to show the effect, and the display may be automatically "correcting" colors in the display.

While polarizing filters are useful for reducing unwanted reflections or glare from a photograph, there are other times in which it is desirable to photograph a scene without the use of a polarizing filter. One such case is when the reflections add to the visual appeal of the scene. Another case is in low light conditions. As polarizing filters can block up to 60% of the light they can increase the required exposure time to an unacceptable degree.

SUMMARY

The present invention relates to cameras and other image capture devices. More particularly, the present invention relates to a camera having a polarizing filter that reduces reflected light during operation of the camera.

In one embodiment of the present invention, a camera having a polarizing filter located internal to the camera between the lens and the electronic image sensor is contemplated.

Another embodiment of the present invention relates to methods for identifying the preferred rotation angle of a polarizing filter to improve color contrast in a photo including the steps of rotating a polarizing filter, monitoring color saturation from the electronic image sensor output as a function of polarizing filter rotation and identifying the rotation angle of the polarizing filter with the highest color saturation.

A further embodiment of the instant invention contemplates a method for identifying the preferred rotation angle of a polarizing filter to improve color contrast in a photo including the steps of passing light through a polarizing filter, the polarizing filter having a rotation angle; creating pixel values in response to the detection of light that has passed through the polarizing filter at the rotation angle; sensing the rotation angle of the polarizing filter; calculating from the pixel values associated with the sensed rotation angle of the polarizing filter a reflection suppression metric value that is sensitive to the suppression of reflections by the polarizing filter; comparing the reflection suppression metric values associated with a plurality of sensed rotation angles of the polarizing filter; determining a preferred rotation angle of the polarizing filter based on the comparison of the plurality of reflection suppression metric values.

A further embodiment of the present invention relates to methods for identifying the preferred rotation angle of a polarizing filter to improve color contrast in a photo including the steps of rotating a polarizing filter, monitoring the brightness from the electronic image sensor output as a function of polarizing filter rotation, and identifying the rotation angle of the polarizing filter with the minimum brightness.

A further embodiment of the present invention relates to an interchangeable lens unit that is configured to be detachably connectable to a camera housing. The interchangeable lens unit includes, but is not limited to, a lens, a polarizing filter, an actuator for rotating the polarizing filter, and a rotation angle sensor for measuring a rotational angle of the polarizing filter. A further embodiment of the present invention relates to a method for producing a composite image. One image is captured with a polarizing filter rotated to a first angle having a first determined reflection suppression metric value. Another image is captured with the polarizing filter rotated to a different second angle having a second determined reflection suppression metric value. A composite image is then produced using the first and second captured images. By way of example only, the first angle is an angle having maximum reflection suppression and the second angle an angle equal to the first angle plus ninety degrees.

These and other aspects, objects, features and advantages of the present invention will be more clearly understood and appreciated from a review of the following detailed description of the preferred embodiments, the Figures, and appended claims.

ADVANTAGEOUS EFFECT

The present invention includes the advantages of determining the preferred rotation angle of a polarizing filter, which improves the color contrast in an image. The polarizing filter can be positioned to filter light going to the image sensor, or the polarizing filter can be positioned to enable all the light to go to the image sensor. For example, in low light level scenes, the filter can be positioned so that all of the light reaches the image sensor.

BRIEF DESCRIPTION OF THE DRAWINGS

Embodiments of the invention are better understood with reference to the following drawings. The elements of the drawings are not necessarily to scale relative to each other.

DETAILED DESCRIPTION

It is well known that a polarizing filter is useful for reducing glare and by doing so producing more color contrast. While viewing a scene through the viewfinder of a digital camera it is often difficult to identify the preferred rotation of the filter as the image quality in the electronic display may not be sufficient to show the effect, and the display may be automatically "correcting" colors in the display. As a result, photographers may find it necessary to remove the polarizer, hold it to their eye, find the proper rotation and then reinstall the filter at that rotation. This makes the use of a polarizing filter impractical for most photography.

The present invention eliminates this problem by monitoring or analyzing the output of the cameras image sensor as the polarizing filter is rotated prior to capturing the image. From this analysis, the desired rotation of the polarizing filter can be determined. The filter can then be rotated to the desired angle and the image captured.

One embodiment of the present invention provides a polarizing filter located internal to a camera or image capture device between the lens and the sensor. Two example configurations of filters and sensors are shown in FIGS. 1, 2a, and 2b.

Figure 1:
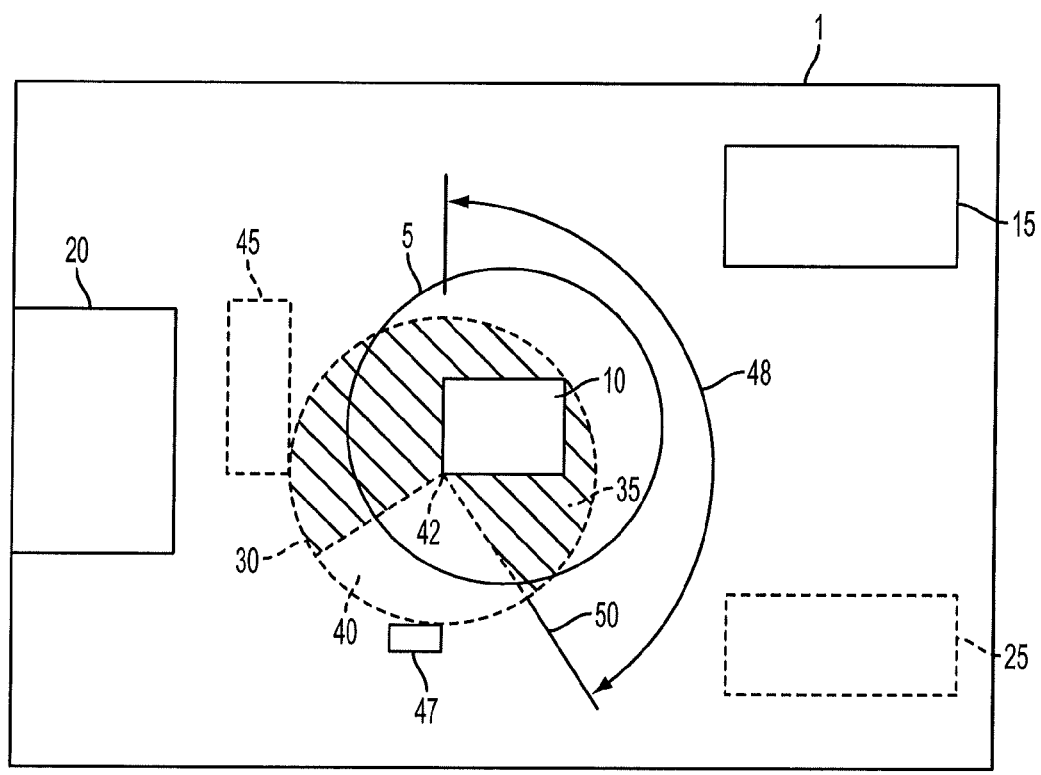
FIG. 1 is a front view of a first exemplary embodiment of the present invention.

In FIG. 1, camera housing 1 has at least one lens 5 through which light is focused on the image sensor 10. The path light takes from the scene being photographed through the lens to the image sensor is commonly referred to as the optical path of camera. The image sensor 10 creates output signals in the form of pixel values in response to the light detected. These signals, or pixel values, can be manipulated or analyzed by an image processor 15 and the image data stored in the camera memory 20. The image processor 15 may be in communication with controller 25. The controller 25 can utilize signals from the image processor as inputs upon which controls various functions of the camera, such as aperture and shutter time, and even the various functions of the image processor such as white balance.

The camera also includes a filter disk 30 located between the lens 5 and the image sensor 10. The filter disk 30 has a polarizing sector 35 and an open sector 40. The polarizing sector 35 is a polarizing filter having a polarization axis 50. The filter disk 30 can be rotated around a rotation axis 42 by a rotation actuator 45 under the control of controller 25. This enables the polarization axis of the polarizing filter to be oriented as desired to prevent undesired polarized specular reflections off surfaces in the scene to be photographed from reaching the image sensor 10. Polarization filters are insensitive to rotations of 180 degrees; that is rotation angle θ and rotation angle θ+180° are functionally the same. As a result, it is not necessary for the polarizing filter to be able to rotate a full 360° to be able to be able to function as if it did. This allows the filter disk 30 to include an open sector 30 that doesn't include a polarizing filter. The open sector 35 can then be rotated in front of the image sensor and by so doing; the polarizing filter can be displaced from the optical path of the camera. In this embodiment, the actuator that rotates the polarization filler can function as an actuator to displace the polarizing filter from the optical path of the camera. The open sector 35 preferably includes an optically transparent material that has the same index of refraction as the polarizing filter in the polarizing sector 35. The focus of light on the image sensor then does not change as the filtering disk rotates the filter disk 30 to place the polarizing sector 35 or open sector 40 into the optical path of the camera. A rotation angle sensor 47 senses the rotation angle 48 of the filter disk and transmits signals containing rotation angle information to the controller 25.

Figure 2A:
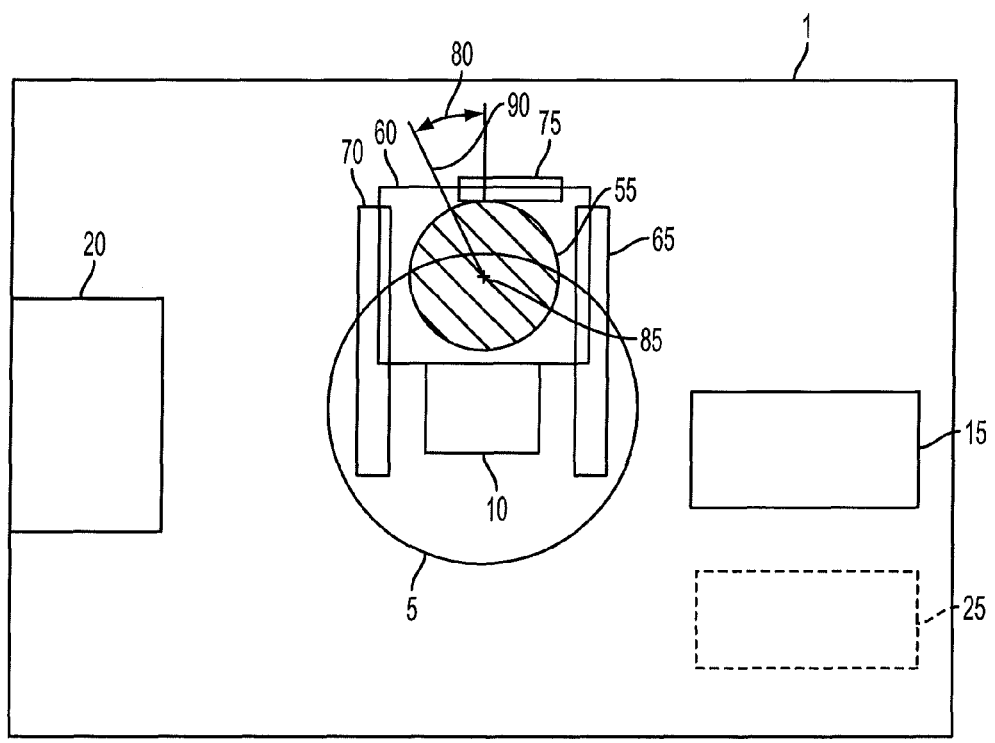
FIG. 2a is a front view of a second exemplary embodiment with the polarizing filter displaced from the optical path.
Figure 2B:
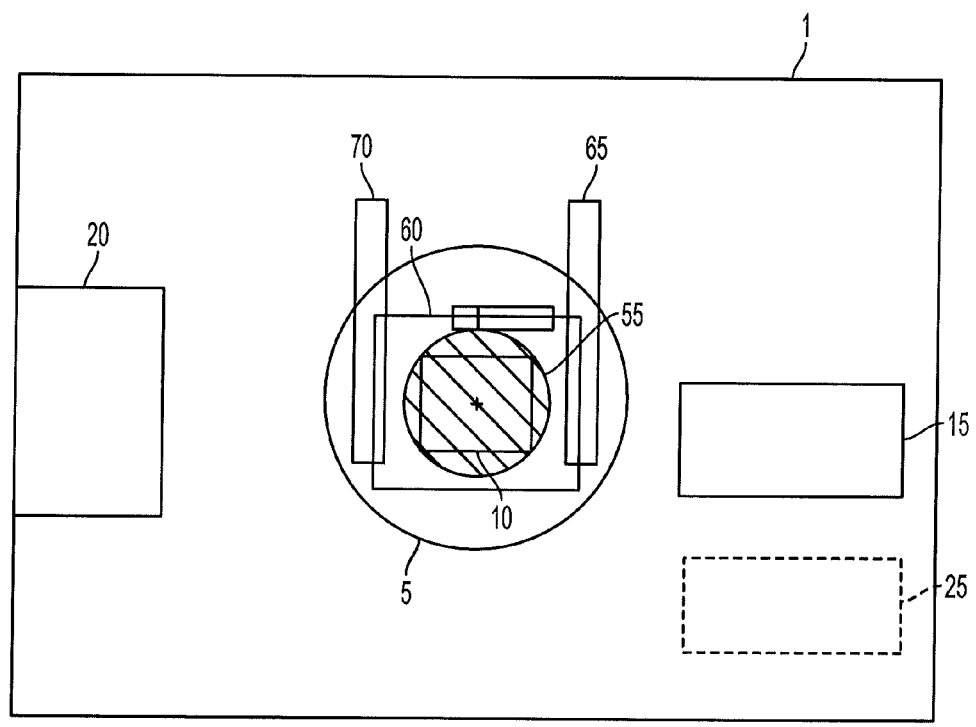
FIG. 2b is a front view of the second exemplary embodiment with the polarizing filter located in the optical path.

A second embodiment is shown in FIGS. 2a and 2b. Like the first embodiment, the camera housing 1 has at least one lens 5 to focus light on the image sensor. It also includes an image processor 15, memory 20, and controller 25 which carry out similar functions to those of the first embodiment. In this embodiment a polarizing filter 55 is mounted on a carriage 60. A rotation actuator 75 is able to rotate the polarization filter about rotation axis 85 in response to signals from the controller 25. In FIG. 2a, the carriage 60 with the polarization filter 55 has been moved by carriage actuator 65 so that the polarizing filter is displaced from the optical path of the camera, allowing unfiltered light to be focused on the image sensor 10. The carriage 60 is moved to position the polarizing filter 55 in front of the image sensor 10 in FIG. 2b.

Other embodiments are anticipated in which other actuator and filter configurations are employed to rotate the polarizing filter while in the optical path of the camera and to displace the polarizing filter from the optical path. While FIGS. 2a and 2b show the carriage 60 to which the polarizing filter 55 is attached moving along a straight carriage guide 70 to displace the polarizing filter 55 into and out of the optical path of the camera, the carriage 60 could comprise a rotation arm that is used to swing the polarizing filter 55 into and out of the optical path. In some embodiments, the rotation angle 80 of the polarizing filter 55 may be sensed by counting the number of actuator pulses sent to the rotation actuator 75 to rotate the filter clock-wise or counter clock-wise. Alternatively, a rotational encoder may be employed to measure the rotation angle 80 of the polarizing filter 55. Such a rotational encoder may be incorporated into the rotation actuator 75 or it can be remote from the rotation actuator 75.

Figure 5:
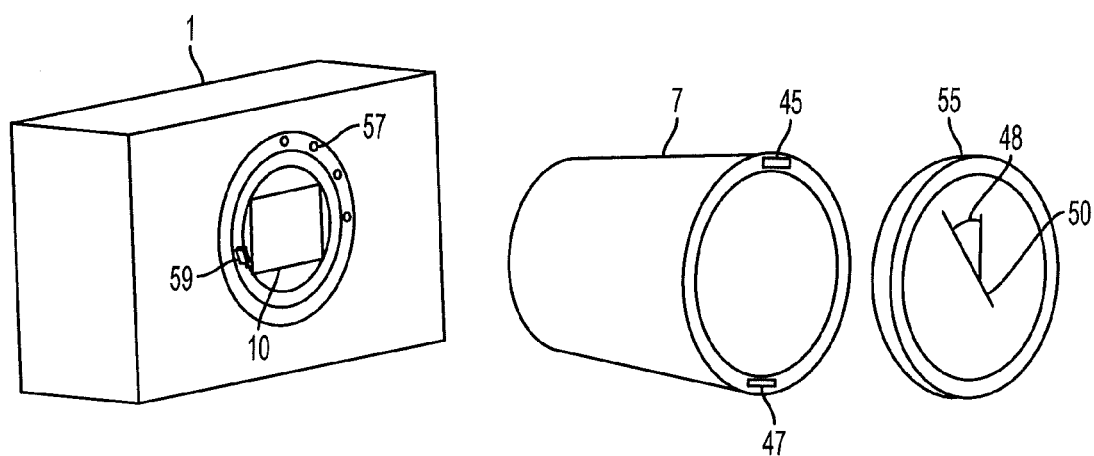
FIG. 5 is a perspective front view of a fourth exemplary embodiment of the present invention.

For single lens reflex cameras and other cameras having lens units that can be interchanged by the photographer, the polarizing filter 55 may be integrated into the camera housing 1, into the lens unit 7, or it may be attachable/detachable from the lens unit as is shown in FIG. 5. In systems where the polarizing filter 55 is either integrated into the lens unit or attachable/detachable from the lens unit, the lens unit 7 may include an actuator 45 for rotating the polarizing filter 55. The actuator 45 in the lens unit may comprise a motor (not shown) in the lens unit that is powered by means of electrical contacts 57 on the camera housing 1 that contact corresponding electrical contacts (not shown) on the lens unit. Alternatively the actuator could comprise a mechanical linkage or other mechanical coupling means in the lens unit that transmits the filter rotation force from a motor (not shown) located within the camera housing. A lever arm 59 is shown by which the force can be coupled from the motor in the camera housing 1 to the mechanical linkage or other mechanical coupling means in the lens unit. The lens unit may also include a rotation angle sensor 47 to measure the rotation angle 80 of the polarizing filter 55 that is either integrated into the lens unit or attachable/detachable from it.

When the polarizing filter 55 is in-place to polarize the light striking the image sensor 10, it can be rotated, possibly concurrently with the auto-focus time, and the image sensor 10 output monitored as a function of filter rotation. As proper rotation of the polarizing filter produces better color contrast, image analysis processing included in image processor 15 may be used to identify a rotation angle with the highest color saturation. This rotation angle for the polarizing filter is used for capturing an image. In low light level scenes, the polarizing filter 55 can be positioned so that all the light can reach the image sensor 10.

One metric that can be used to evaluate the suppression of glare and reflections in a scene to be imaged is a measurement of the depth, intensity, or saturation of the colors in the scene. One measure of the saturation of a color is $$C_{ab}^* = \sqrt{a^{*2} + b^{*2}};$$

where a* and b* are the CIE L*a*b* coordinates of the color. The saturation value can be calculated for each pixel in the image. The average saturation for all pixels in the image can be calculated as a measure of the color saturation for the whole image. The average saturation at different filter rotation angles can then be used to determine a desired rotation angle to use for capturing the image. While this calculation of the saturation of colors is effective, other metrics can be used as measurement of perceived intensity of the colors in an image. For example, one can determine the absolute value of the a* value and of the b* value for each pixel in the image. The average of the absolute values of these two parameters can be added together to form another metric on perceived intensity of the colors in an image.

The desired rotation of the polarizing filter 55 may also be determined by analyzing the brightness of the image as a function of the rotation angle of the filter polarization axis 90. The reflections that one is trying to remove by the use of the polarizing filter add to the brightness of the image. Therefore a measure of overall image brightness as a function of polarizing filter rotation angle can also be used as a measure for determining the preferred filter rotation. The proper polarization vector for reducing the polarized glare coming from the surfaces will not only have increased saturation, but also a reduced brightness component, L*, in the IE L*a*b* coordinate system.

As described above, the color saturation measurements and the image brightness measurements carried out by the image processor can individually serve as effective metrics for detecting the suppression of reflections in the scene being photographed. Other image processing algorithms can be employed out by the image processor 15 for the detection of the suppression of reflections in the scene being photographed. These other algorithms or reflection suppression metrics may include combinations of measurements of color intensity or saturation and measurements of image brightness to determine an optimum rotation angle 80 for the polarization filter 55. Furthermore, while the examples described above are based on the L*a*b* color coordinates for each pixel, other metrics may be derived using other color coordinate systems. Other algorithms may derive a color intensity value based on only a portion or sampling of the pixels in the image rather than involve all pixels as the examples above have done.

Figure 3:
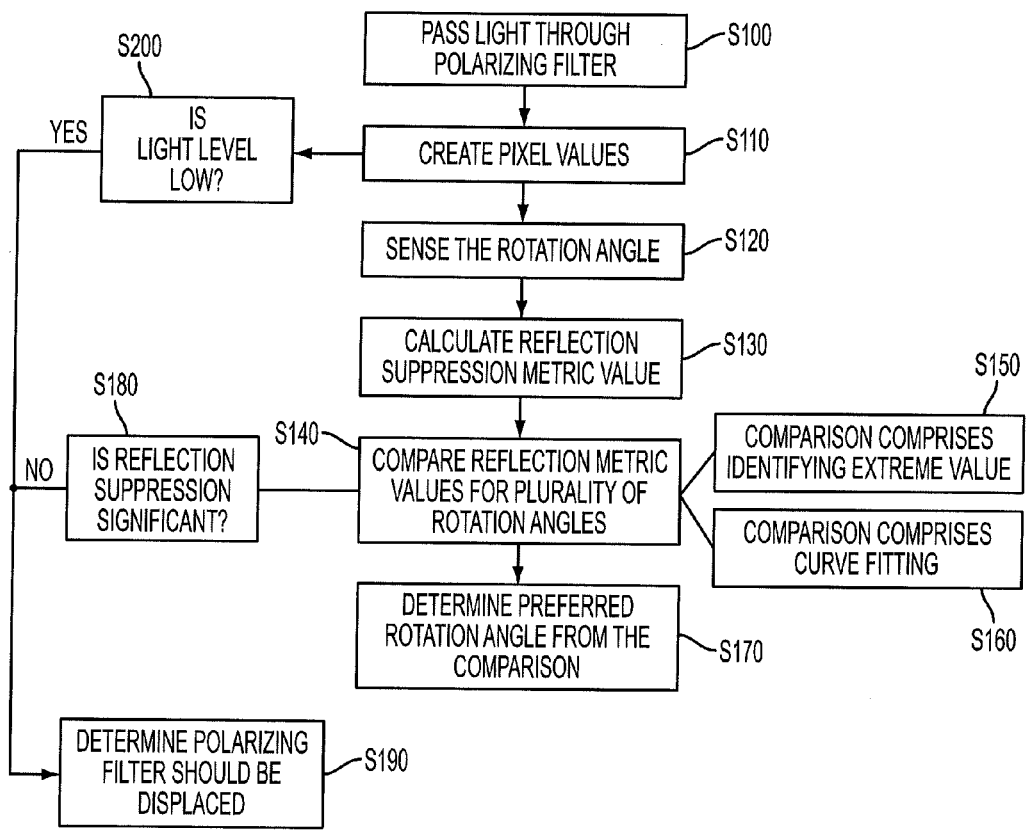
FIG. 3 is a diagrammatic representation of a method for determining a preferred rotation angle of a polarizing filter.

A method for determining a preferred rotation angle of the polarizing filter is illustrated in FIG. 3. The light striking the image sensor passes through the polarizing filter in step S100. The polarizing filter has a rotation angle around the optical axis. The image sensor creates pixel values based on the detection of light that strikes the image sensor in step S110. In step S120, the rotation angle of the polarizing filter is sensed. The sensing of the rotation angle may be sensed by a variety of means such as a rotational encoder or a counting of actuator steps as described above. Step S130 is the calculation of a reflection suppression metric value based on the pixel values. As described above the parameters related to the intensity of color, such as color saturation, or parameters related to the brightness, or combinations of such parameters may be used as metrics for the suppression of reflections. Reflection suppression metric values associated with a plurality of rotation angle values are compared in step S140. In S150, the comparison may involve identifying an extreme value of the reflection suppression metric value that is identifying the maximum or the minimum value from among the set of such values associated with the plurality of rotation angles of the polarizing filter. For example, identifying the minimum value would be appropriate when the reflection suppression metric is a measurement of brightness in the image. Conversely, a comparison comprising identifying the maximum value would be appropriate for a color saturation based metric of reflection suppression. Knowing that the polarizing filter will produce the maximum amount of reflection suppression at a rotation angle that is 90° away from the angle at which it produces least or minimum amount of suppression of the reflections, allows one to determine the rotation angle for maximum reflection suppression from a determination of the angle at which the least amount of reflection suppression occurs. A comparison of the reflection suppression metric values may also comprise fitting those results to a function as indicated in S160. For the curve fit, the desired rotation angle having the optimum reflection suppression metric value can be calculated. The use of such a curve fitting type of comparison does not restrict the selection of the preferred angle to one of the tested angles. The comparison of the reflection suppression metric values provides the means to determine the rotation angle of the polarizing filter having the greatest degree of reflection suppression S170. For a wide range of scenes to be photographed the rotation angle determined in this manner will produce the most pleasing photograph and it will therefore be the preferred rotation angle for the polarizing filter. The controller 25 could then send appropriate signals to the rotation actuator to rotate the polarizing filter to the preferred rotation angle before capturing the image. The method may also involve testing to determine whether the reflection suppression by means of the polarizing filter produces significant results in step S180. If a significant reduction in reflections is not found, the method may determine that the polarizing filter should be displaced from the optical path per S190. Alternatively or additionally, the method may analyze the pixel values to determine whether the light level in the image is low as indicated in step 200. A low light level could also lead to a determination that the polarizing filter should be displaced from the optical path in S190.

Many cameras provide the photographer with an exposure bracketing function that captures multiple images at several exposures centered on the nominal exposure. This function allows the photographer to review the pictures at a later time to determine the preferred exposure level. In a similar manner a polarization bracketing function could be provided by the camera to take a several pictures having several filter rotation angles centered around the rotation angle determined by the image processing methods described above.

Figure 7:
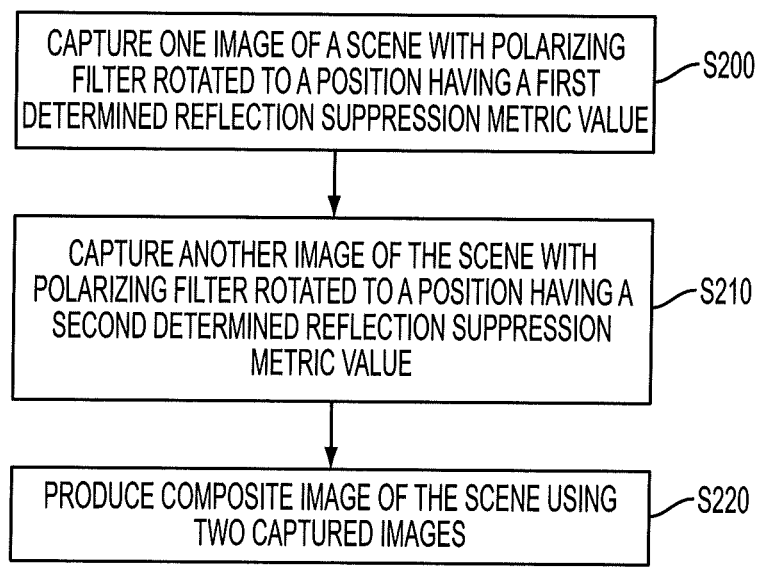
FIG. 7 is a diagrammatic representation of a method for producing a composite image.

In another embodiment, a composite image can be produced using the method depicted in FIG. 7. The camera captures two images of a scene at S200 and S210; one image with the polarizing filter rotated to a first angle having a first predetermined reflection suppression metric value, and the other image with the polarizing filter rotated to a different second angle having a second predetermined reflection suppression metric value. By way of example only, the first angle can be determined using image processing methods describe earlier, while the second angle corresponds to a rotation angle rotated 90° away from the first angle. The first image will have the highest color saturation and the least amount of reflected light while the second image will have the highest degree of specularly reflected light and least color saturation. A composite image is then produced using the two images, as shown at S220. Photo editing software can be used to produce the composite image having any desired mix ratio of the two captured images. This effectively allows one to effectively rotate the polarization filter to any desired angle through the use of the photo editing software. Other embodiments in accordance with the invention can capture more than two images to produce a composite image. Additionally, different angle values can be used for the rotation angles of the polarizing filter.

In another embodiment, a number of pictures, greater than two, would be taken at evenly spaced rotation angles to map out the full range of polarization axis rotations. This would allow even more options for photo editing.

While the algorithms presented here should generally be effective for identifying the preferred rotation of the polarizing filter, there will be occasions where the photographer will wish to override the algorithm derived filter orientation. Therefore the camera may include a manual control for the filter orientation.

This process of rotating the polarizing filter while monitoring or evaluating the reflections suppression metric can comprise rotating the polarizing filter to specific rotation angles and pausing at those rotation angles to allow the light to be sensed and the reflection suppression metric value calculated at each rotation step. Alternatively, the reflection suppression metric value can be obtained on the fly as the polarizing filter is being rotated without such pauses. The process for determining the preferred rotation of the polarizing filter can be carried out in sequence with the camera auto-focus function, in which the camera determines the proper focus, or alternatively it can be concurrent with the auto-focus function.

Figure 4:
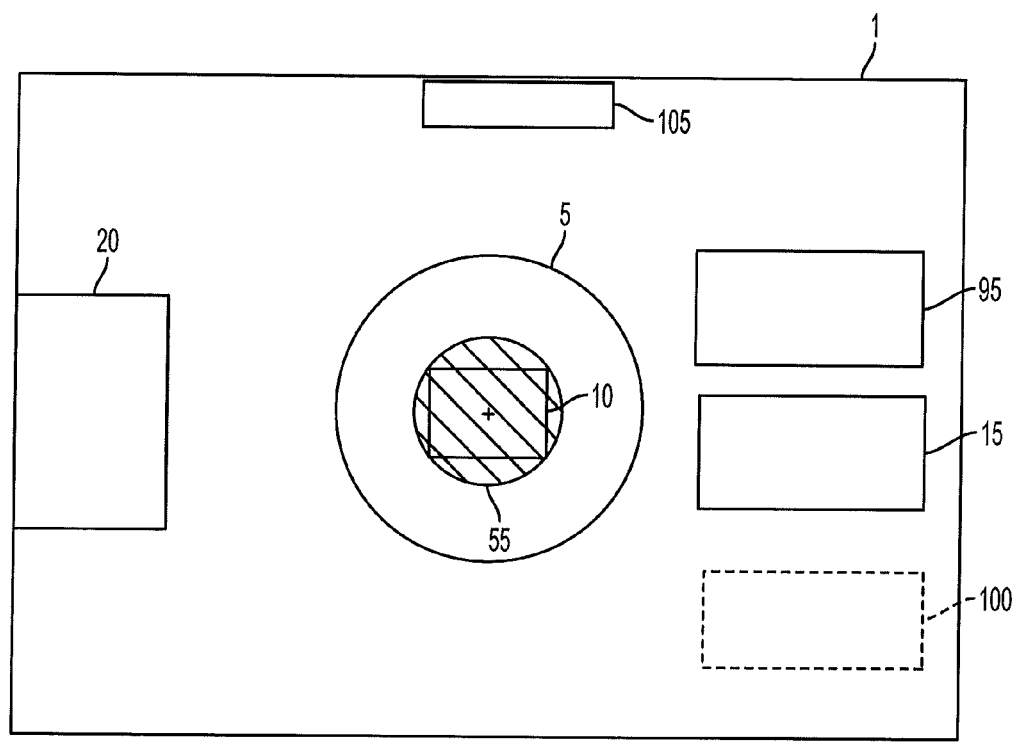
FIG. 4 is a front view of a third exemplary embodiment of the present invention.
Figure 6:
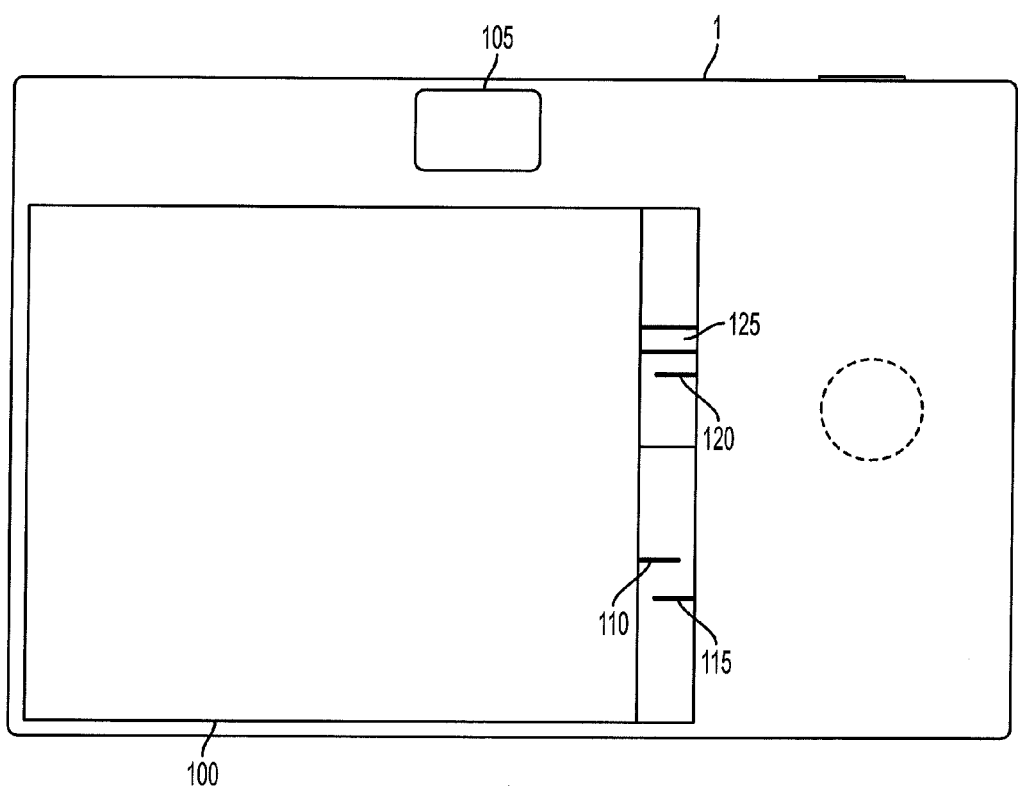
FIG. 6 is a rear view of the fourth embodiment shown in FIG. 5.

In the embodiments described above, actuators are employed to rotate the polarizing filter while acquiring reflection suppression metric values. Once the preferred rotation angle is determined from the analysis of the reflection suppression metric values, the actuators are employed to rotate the polarizing filter to the desired rotation angle. In an alternate embodiment shown in FIG. 4, no actuators are integrated into the camera or lens unit to rotate the polarizing filter 55, or to insert or remove the polarizing filter 55 from the optical path, but rather these operations are carried out manually by the photographer. A rotation angle sensor 95, such as rotational encoder, is used to sense the rotation angle of the polarizing filter 55 while it is rotated by the photographer. In systems having interchangeable lens units 7, the rotation angle sensor 95 may be incorporated into the lens unit (FIG. 5) or it may be incorporated into the camera housing 1 to which the lens unit attaches Reflection suppression metric values are acquired along with the output of the rotation angle sensor 95 while the photographer is manually rotating the polarizing filter 55. Through analysis of the reflection suppression metric values and the output of the rotation angle sensor 95 by image processor 15, a preferred rotation angle for the polarizing filter 55 may be determined. As shown in FIG. 6, the camera has an output 100 to provide feedback to the photographer, possibly by means or features in the camera display (e.g., output 100 implemented as a display) or in the camera viewfinder 105, that enable the photographer to rotate the polarizing filter 55 to the preferred rotation angle. One example of display features that can be employed as an output is a needle 110 to indicate the current rotation angle of the filter along with a second needle 115 to indicate the preferred polarization rotation angle, in much the same manner as needle 120 have been used to show the exposure level relative to a recommended exposure range 125 It is anticipated that many other display features or other signals may serve as an output 100 to provide feedback to the photographer concerning the filter rotation angle to enable the photographer to rotate the polarizing filter 55 to the preferred rotation angle determined from the reflection suppression metric values.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents. And even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

| PARTS LIST | |
|---|---|
| 1 | Camera Housing |
| 5 | Lens |
| 7 | Lens Unit |
| 10 | Image Sensor |
| 15 | Image Processor |
| 20 | Memory |
| 25 | Controller |
| 30 | Filter Disk |
| 35 | Polarizing Sector |
| 40 | Open Sector |
| 42 | Rotation axis |
| 45 | Rotation Actuator |
| 47 | Rotation Angle Sensor |
| 48 | Rotation Angle |
| 50 | Polarization Axis |
| 55 | Polarization Filter |
| 57 | Electrical Contacts |
| 59 | Arm |
| 60 | Carriage |
| 65 | Carriage Actuator |
| 70 | Carriage Guide |
| 75 | Rotation Actuator |
| 80 | Rotation Angle |
| 85 | Rotation Axis |
| 90 | Polarization Axis |
| 95 | Rotation Angle Sensor |
| 100 | Output |
| 105 | Camera Viewfinder |
| 110 | Current rotation angle needle |
| 115 | Preferred rotation angle needle |
| 120 | Exposure level Needle |
| 125 | Recommended exposure range |

The invention claimed is:

1. A camera comprising:
a camera housing;
a lens coupled to the camera housing;
an image sensor in selective communication with the lens;
a polarizing filter operatively coupled to the image sensor and having a polarization axis, the polarizing filter configured to be manually rotated without use of actuators;
a rotation angle sensor to sense a rotation angle of the polarizing filter as the polarizing filter is manually rotated;
a processor operatively coupled to the image sensor and the rotation angle sensor, the processor configured to execute image analysis processing software to analyze reflection suppression metric values based on output from the rotation angle sensor acquired while the polarizing filter is manually rotated to identify a preferred rotation angle of the polarizing filter; and
a display mechanism operatively coupled to the processor and configured to provide feedback regarding the rotation angle of the polarizing filter and the identified preferred polarization rotation angle to enable manual rotation of the polarizing filter to the identified preferred rotation angle.

2. The camera of claim 1, wherein the processor is further configured to monitor a color saturation while the polarizing filter is being rotated.

3. The camera of claim 2, wherein the reflection suppression metric values are related to the monitored color saturation.

4. The camera of claim 1, wherein the reflection suppression metric values are related to brightness.

5. The camera of claim 1, wherein the image analysis processing software to analyze reflection suppression metric values is based on pixel values from the image sensor.

6. The camera of claim 1 wherein the rotation angle sensor for sensing the rotation angle of the polarizing filter comprises a rotational encoder.

7. The camera of claim 1 wherein the lens comprises an interchangeable lens unit.

8. The camera of claim 7 wherein the rotation angle sensor is incorporated into the interchangeable lens unit.

9. The camera of claim 8, wherein the polarizing filter comprises a polarizing filter that is detachably connectable to the interchangeable lens unit.

10. The camera of claim 1 wherein the display mechanism comprises one of a display screen of the camera and a viewfinder of the camera.

* * * * *